E. A. OLIVER.
PAIL STOOL.
APPLICATION FILED JAN. 13, 1915.
1,138,141.
Patented May 4, 1915.
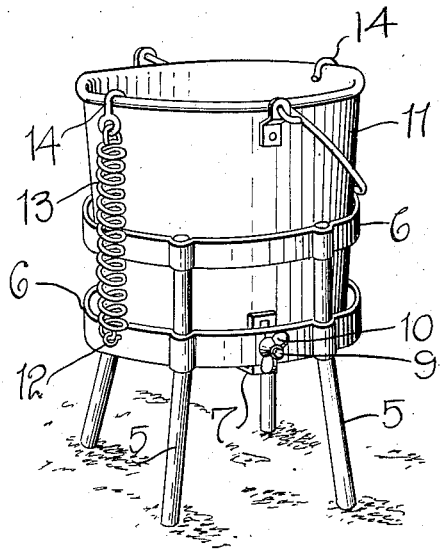
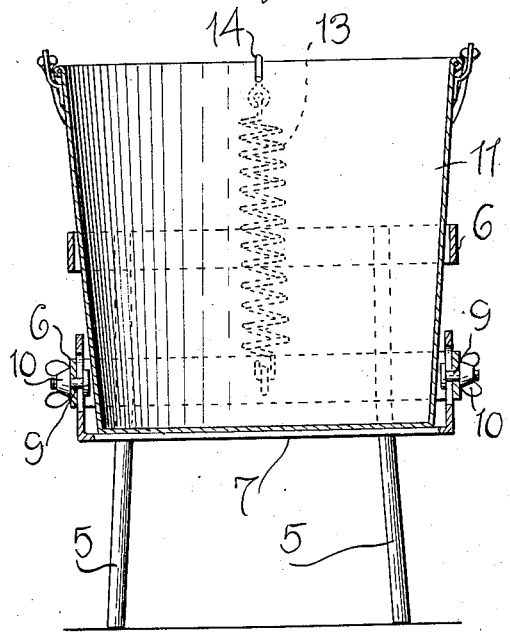
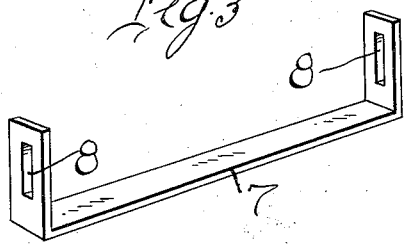
Witnesses
Robert M. Sutphen
A. J. Hurd
Inventor
E. A. Oliver
By Watson E. Coleman
Attorney

UNITED STATES PATENT OFFICE.

ELAM A. OLIVER, OF BELLEVILLE, WISCONSIN.

PAIL-STOOL.

1,138,141.

Specification of Letters Patent.  Patented May 4, 1915.

Application filed January 13, 1915.  Serial No. 2,066.

*To all whom it may concern:*

Be it known that I, ELAM A. OLIVER, a citizen of the United States, residing at Belleville, in the county of Dane and State of Wisconsin, have invented certain new and useful Improvements in Pail-Stools, of which the following is a specification, reference being had to the accompanying drawings.

This invention relates to an improved pail stool or support, and has for its primary object to provide a simple, inexpensive, and convenient stool for milk pails, including means for securely holding the pail in position upon the support, said means, however, admitting of the easy and quick removal of the pail.

The invention has for one of its more particular objects to provide a milk pail stool embodying an adjustable element upon which the pail directly rests, and holding springs permanently attached at one of their ends to the stool and provided with hooks upon their other ends for engagement over the upper rim of the bucket, the adjustment of the stool element compensating for decrease in the resiliency of the springs, whereby their effectiveness may be prolonged.

With the above and other objects in view, my invention consists in the novel features of construction, combination, and arrangement of parts to be hereinafter more fully described, claimed, and illustrated in the accompanying drawing, in which, Figure 1 is a perspective view of a milk pail stool constructed in accordance with the preferred embodiment of my invention; Fig. 2 is a vertical section; and Fig. 3 is a detail perspective view of the adjustable pail supporting bar.

Referring in detail to the drawing, 5 designates the supporting legs of the stool, any desired number of which may be employed. To the upper end portions of these legs, the spaced rings 6 are soldered or otherwise permanently secured.

7 designates a horizontal base bar, the extremities of which are angularly bent and vertically disposed against the inner face of the lowermost ring 6. These upturned ends of the base bar are longitudinally slotted, as at 8, to receive the screws 9 which are disposed through openings provided in the ring 6. The inner ends of these screws are headed while suitable clamping nuts 10 are threaded upon the outer ends thereof.

The milk pail, indicated at 11, is adapted to be arranged within the rings 6, the lower edge of said pail resting upon the horizontal base bar 7. To eyes 12, secured in the lowermost ring 6 at diametrically opposite sides thereof, the coil springs 13 are attached at one of their ends. The other ends of these springs are provided with the hooks 14 which are adapted to be engaged over the upper edge or rim of the pail 11, as clearly shown in Fig. 1 of the drawing. In this manner, it will be understood that the pail is securely held upon the stool against vertical movement. It is apparent, however, that in the use of the device, the springs 13 will gradually decrease in resiliency, so that they would become less and less effective, were it not for the provision of the adjustable base bar 7 of the stool. When it is seen that the springs are losing their resiliency, the operator loosens the clamping screws 10 and moves the horizontal bar 7 upwardly so that the pail will be supported at a higher elevation with respect to the rings 6. The nuts 10 are then again adjusted into clamping engagement with the lower ring 6 to securely hold the bar 7 against further movement. In order to now engage the hooks 14 on the free ends of the springs, with the upper edge of the pail, it will be necessary to expand the springs to some extent so that they will exert their contractual action to create a downward pressure of the pail upon the base bar 7.

From the foregoing description, taken in connection with the accompanying drawing, it will be seen that I have provided a very serviceable and convenient milk pail stool or support and one which is very durable in practical use. It is obvious that the rings 6 of the stool may be made of various diameters so as to receive pails of different sizes. The device is also susceptible of many other modifications in the form, proportion, and arrangement of the several elements employed, and I, therefore, reserve the privilege of resorting to all such legitimate changes as may be fairly embodied within the spirit and scope of the invention as claimed.

Having thus fully described my invention, what I desire to claim and secure by Letters Patent is:—

1. A milk pail stool including a vertically adjustable base bar upon which the pail immediately rests and is supported, and resilient holding devices connected to the stool and adapted for detachable connection to the upper edge of the pail.

2. A milk pail stool including a vertically adjustable base bar upon which the pail immediately rests and is supported, and a coil spring permanently attached at one end to the stool and provided with means on its other end for detachable engagement with the upper edge of the pail.

3. A milk pail stool including legs, spaced rings secured to said legs, a horizontal base bar having its ends engaged against the inner face of one of the rings at diametrically opposite points and adapted to immediately receive and support the pail, means for vertically adjusting said base bar upon the ring, and a plurality of resilient holding devices permanently attached at one of their ends to said ring and provided with means on their other ends for detachable engagement over the upper edge of the pail.

4. A milk pail stool including supporting legs, spaced rings secured to said legs, a horizontal base bar having vertically disposed slotted end portions engaged against the inner face of one of said rings at diametrically opposite points, clamping means extending through the slotted ends of said bar and through said ring to adjustably secure the bar upon the ring, and coil springs permanently connected at one of their ends to said ring at diametrically opposite points and provided with means on their other ends for detachable engagement with the upper edge of the pail.

In testimony whereof I hereunto affix my signature in the presence of two witnesses.

ELAM A. OLIVER.

Witnesses:
C. B. MINCH,
MYRTIE B. HARMON.